(12) United States Patent
Heider et al.

(10) Patent No.: US 7,122,951 B2
(45) Date of Patent: Oct. 17, 2006

(54) DIELECTRIC BARRIER DISCHARGE LAMP WITH IMPROVED COLOR REPRODUCTION

(75) Inventors: Jürgen Heider, München (DE); Renate Hirrle, Augsburg (DE); Regine Krämer, München (DE); Ulrich Müller, München (DE); Martin Zachau, Geltendorf (DE)

(73) Assignee: Patent-Treuhand-Gesellschaft fuer Elektrisch Gluehlampen mbH, Munich (DE)

( * ) Notice: Subject to any disclaimer, the term of this patent is extended or adjusted under 35 U.S.C. 154(b) by 216 days.

(21) Appl. No.: 10/492,026

(22) PCT Filed: Aug. 7, 2003

(86) PCT No.: PCT/DE03/02654

§ 371 (c)(1),
(2), (4) Date: Apr. 8, 2004

(87) PCT Pub. No.: WO2004/021397

PCT Pub. Date: Mar. 11, 2004

(65) Prior Publication Data

US 2004/0217687 A1 Nov. 4, 2004

(30) Foreign Application Priority Data

Aug. 8, 2002 (DE) .............................. 102 36 420

(51) Int. Cl.
*H01J 1/62* (2006.01)
*H01J 61/42* (2006.01)
*H01J 61/44* (2006.01)
H01J 1/63 (2006.01)
H01J 63/04 (2006.01)

(52) U.S. Cl. ............. 313/487; 313/485; 313/486; 313/581

(58) Field of Classification Search ......... 313/483–487
See application file for complete search history.

(56) References Cited

U.S. PATENT DOCUMENTS

| | | | |
|---|---|---|---|
| 5,471,113 A * | 11/1995 | De Backer et al. ......... 313/487 |
| 5,604,410 A | 2/1997 | Vollkommer et al. |
| 6,034,470 A | 3/2000 | Vollkommer et al. |
| 6,045,721 A * | 4/2000 | Zachau et al. ........ 252/301.4 R |
| 6,641,448 B1 * | 11/2003 | Wang et al. ................. 445/23 |
| 2002/0047620 A1 | 4/2002 | Feldmann et al. |
| 2004/0251807 A1 * | 12/2004 | Huber et al. ................ 313/484 |

FOREIGN PATENT DOCUMENTS

| EP | 0 733 266 | 4/1993 |
|---|---|---|
| WO | WO 9423442 A1 * | 10/1994 |
| WO | WO 9704625 A1 * | 2/1997 |

\* cited by examiner

*Primary Examiner*—Mariceli Santiago
(74) *Attorney, Agent, or Firm*—Robert F. Clark

(57) ABSTRACT

The invention proposes a dielectric barrier discharge lamp having a phosphor mixture and improved color rendering. The phosphor mixture comprises at least the phosphor components A: cerium-activated yttrium aluminate ($Y_3Al_5O_{12}$:Ce) and B: europium-activated barium magnesium aluminate ($BaMgAl_{10}O_{17}$:Eu). To further improve the color rendering and to match the emission spectrum to the spectral sensitivity of film, the phosphor mixture optionally also comprises the phosphor component C: cerium- and manganese-activated gadolinium magnesium zinc pentaborate ($Gd(Zn,Mg)B_5O_{10}$:(Ce, Mn)) and/or the phosphor component D: europium-activated strontium aluminate ($Sr_4Al_{14}O_{25}$:Eu).

6 Claims, 6 Drawing Sheets

DIELECTRIC BARRIER DISCHARGE LAMP WITH IMPROVED COLOR REPRODUCTION

TECHNICAL FIELD

The invention relates to a dielectric barrier discharge lamp.

In this context, the term "dielectric barrier discharge lamp" encompasses sources of electromagnetic radiation based on dielectric barrier gas discharges.

By definition, a dielectric barrier discharge lamp requires at least one so-called dielectric barrier electrode. A dielectric barrier electrode is separated from the interior of the discharge vessel or from the discharge medium by means of a dielectric. This dielectric—which constitutes the actual dielectric barrier—may, for example, be designed as a dielectric layer which covers the electrode, or alternatively it may be formed by the discharge vessel of the lamp itself, specifically if the electrode is arranged on the outer side of the wall of the discharge vessel. In the case of lamps in which it is defined whether the electrodes operate as cathodes or anodes, i.e. for operation with unipolar voltage pulses, at least the anodes are dielectrically separated from the discharge medium (cf. EP 0 733 266 B1).

The ionizable discharge medium usually consists of a noble gas, for example xenon, or a gas mixture. During the gas discharge, which is preferably operated by means of a pulsed operating method described in EP 0 733 266 B1, what are known as excimers are formed. Excimers are excited molecules, e.g. $Xe_2^*$, which emit electromagnetic radiation when they return to the generally unbonded ground state. In the case of $Xe_2^*$, the maximum of the molecular band radiation lies at approx. 172 nm. UV/VUV radiators of this type are used in process engineering, for example for surface cleaning, photolysis, ozone generation, metallization and UV curing. However, the present invention relates to a variant in which a phosphor layer for converting VUV radiation into radiation with longer wavelengths, in particular visible radiation (light), is provided.

PRIOR ART

A lamp for general-purpose illumination is already known from EP 0 733 266 B1, which was cited in the introduction. This lamp includes a three-band phosphor comprising the components barium magnesium aluminate ($BaMgAl_{10}O_{17}$:Eu), lanthanum phosphate ($LaPO_4$:(Tb, Ce)) and gadolinium yttrium borate (($Gd, Y)BO_3$:Eu). One drawback of this lamp is its relatively moderate color rendering index. However, a high color rendering index is important for true-color reproduction of body colors. Moreover, for use in film recording technology, it is desirable for the emission spectrum of the lamp to be matched to the spectral sensitivity of the film material in order to enable corresponding objective filters to be dispensed with as far as possible in the recording equipment. This problem becomes even more acute if a plurality of different light sources, for example for background lighting and spotlighting, with different spectra are to be used. Specifically, in this case, filtering is virtually impossible.

U.S. Pat. No. 6,034,470 shows a flat dielectric barrier discharge lamp which is likewise provided with the abovementioned three-band phosphor. This flat lamp is intended in particular for the backlighting of liquid crystal display screens.

SUMMARY OF THE INVENTION

The object of the present invention is to provide a dielectric barrier discharge lamp with improved color rendering. A further aspect is improved matching of the spectrum of the lamp to the spectral sensitivity of film material.

In a dielectric barrier discharge lamp having the features of the preamble of claim 1, this object is achieved by the features of the characterizing clause of claim 1. Particularly advantageous configurations are to be found in the dependent claims.

The invention also claims protection for a film light having a dielectric barrier discharge lamp according to the invention, in particular also in conjunction with a dielectric barrier discharge lamp according to the invention of flat design for diffuse illumination.

The invention proposes a dielectric barrier discharge lamp having a phosphor mixture, the phosphor mixture comprising at least the phosphor components A: cerium-activated yttrium aluminate ($Y_3Al_5O_{12}$:Ce) and B: europium-activated barium magnesium aluminate ($BaMgAl_{10}O_{17}$:Eu). This lamp is distinguished by an improved color rendering.

If the phosphor mixture does not comprise any further phosphor components, it has proven expedient, in particular for a color temperature of approx. 7100 K, if the following applies to the portions by weight in the mixture:

$0.15 \leq A \leq 0.35$ and $0.65 \leq B \leq 0.80$ and $A+B=1$, preferably $0.24 \leq A \leq 0.32$ and $0.68 \leq B \leq 0.76$ and $A+B=1$.

The color rendering of the lamp can be improved further by an additional red-emitting phosphor component C, the maximum emission of which is at a wavelength of 630±15 nm and the full width at half maximum of which is greater than 50 nm.

The phosphor component C:

cerium- and manganese-activated gadolinium magnesium zinc pentaborate ($Gd(Zn, Mg)B_5O_{10}$:(Ce, Mn))

is particularly suitable for this purpose.

A further improvement to the color rendering of the lamp can be achieved with an additional blue-green-emitting phosphor component D, the maximum emission of which is at a wavelength of 490±20 nm and the full width at half maximum of which is greater than 50 nm.

The phosphor component D:

europium-activated strontium aluminate ($Sr_4Al_{14}O_{25}$:Eu)

is particularly suitable for this purpose.

Tests have shown that it is advantageous if the following applies to the proportions by weight in the mixture:

$0.01 \leq A \leq 0.50$, $0.05 \leq B \leq 0.50$, $0.05 \leq C \leq 0.70$,
$0 \leq D \leq 0.25$ and $A+B+C+D=1$.

The color temperatures which are of relevance in practice, in particular between approx. 3200 K and 7100 K, for the lamp according to the invention can be set within the abovementioned ranges.

In particular with a view to adapting to the spectral film sensitivity and for color temperatures of between approx. 7000 K and 5500 K, it is advantageous if the following applies to the proportions by weight in the mixture:

$0.01 \leq A \leq 0.50$, $0.10 \leq B \leq 0.50$, $0.05 \leq C \leq 0.50$,
$0 \leq D \leq 0.25$ and $A+B+C+D=1$.

It is particularly advantageous if the following applies to the proportions by weight in the mixture:

$0.10 \leq A \leq 0.40, 0.15 \leq B \leq 0.40, 0.10 \leq C \leq 0.40,$
$0 < D \leq 0.15$ and $A+B+C+D=1$.

For a color temperature of approx. 6800 K, it is particularly advantageous if the following applies to the proportions by weight in the mixture:

$0.20 \leq A \leq 0.24, 0.36 \leq B \leq 0.40, 0.29 \leq C \leq 0.33$
$0.07 \leq D \leq 0.11$ and $A+B+C+D=1$.

For a color temperature of approx. 5700 K, it is particularly advantageous if the following applies to the proportions by weight in the mixture:

$0.23 \leq A \leq 0.28, 0.30 \leq B \leq 0.39, 0.30 \leq C \leq 0.39$
$0.03 \leq D \leq 0.10$ and $A+B+C+D=1$.

For a color temperature of approx. 3200 K, it is advantageous if the following applies to the proportions by weight in the mixture:

$0.14 \leq A \leq 0.20, 0.05 \leq B \leq 0.12, 0.58 \leq C \leq 0.67$
$0.05 \leq D \leq 0.15$ and $A+B+C+D=1$.

It is particularly advantageous if the following applies to the proportions by weight in the mixture:

$0.16 \leq A \leq 0.18, 0.07 \leq B \leq 0.09, 0.62 \leq C \leq 0.65$
$0.10 \leq D \leq 0.12$ and $A+B+C+D=1$.

Specific details on the weight ratios of the individual components of a dielectric barrier discharge lamp which is improved both in terms of good color rendering and in terms of the spectral sensitivity of film material are to be found in the description of the exemplary embodiment.

The abovementioned ranges for the proportions by weight of the components of the phosphor mixture take account, inter alia, of the inaccuracies and tolerances which always occur in practice, for example the fact that the quantum efficiencies of different phosphor batches typically differ slightly on account of slight fluctuations in production, etc. Moreover, the focal point of fine-tuning of the phosphor mixture, in particular the color temperature, may differ slightly depending on the specific use. All this can be successfully controlled using suitable tests carried out on a small number of finely graded mixture variations within these ranges.

In one preferred embodiment, the dielectric barrier discharge lamp according to the invention is filled with xenon, typically with a filling pressure in the range from 50 to 200 mbar, preferably between 100 and 150 mbar. As a result, the dielectric barrier discharge generates xenon excimer band radiation with a maximum at approx. 172 nm, which excites the phosphors. The quantum efficiency of the phosphors for this exciting radiation should be taken into account both when selecting the phosphor components and when selecting their ratios in the mixture, in order to ensure the highest possible light yield. A further aspect is the maintenance of the phosphor components during long-term excitation with this radiation. In this case, for each phosphor component, the minimum possible decrease in the intensity of the converted radiation during the service life of the lamps is desired.

BRIEF DESCRIPTION OF THE DRAWINGS

The invention is to be explained in more detail below on the basis of a number of exemplary embodiments. In the drawing.

PREFERRED EMBODIMENT OF THE INVENTION

Figure 1A:
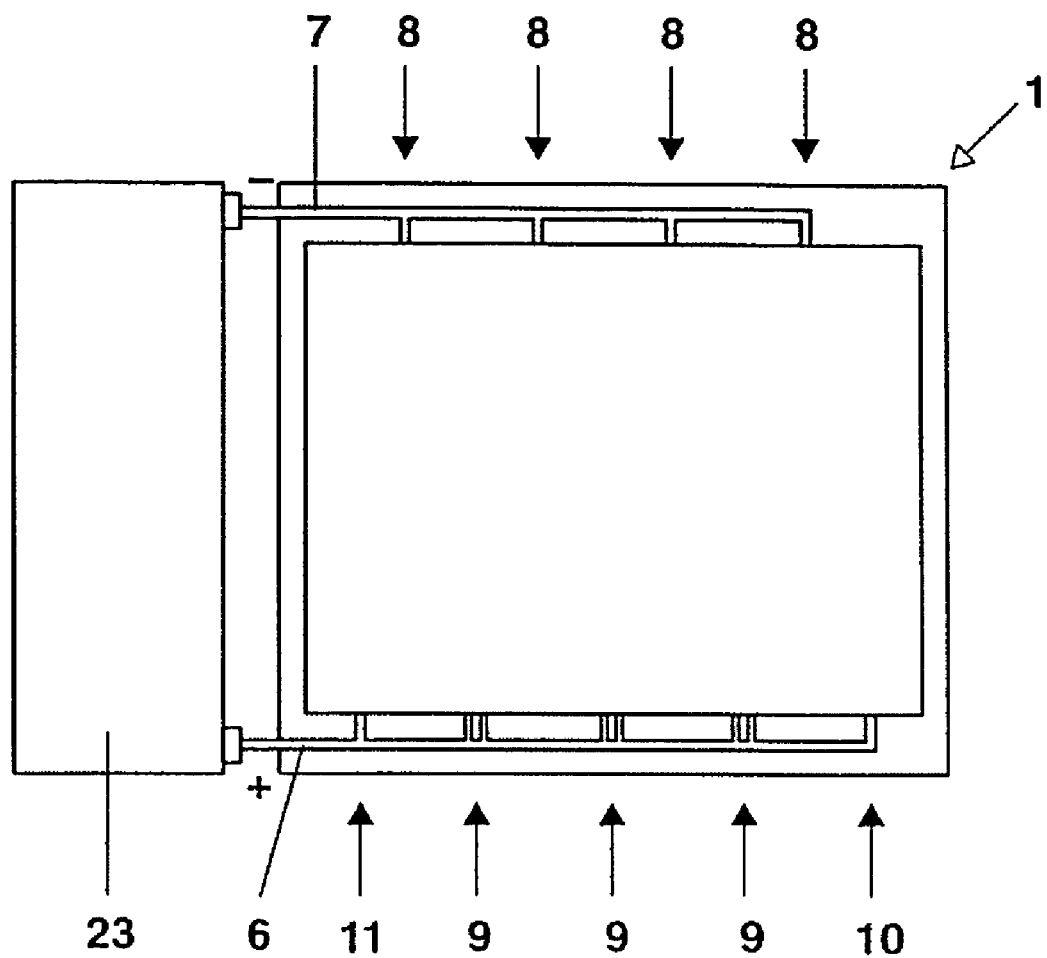
FIG. 1a shows a diagrammatic plan view of a dielectric barrier discharge lamp according to the invention.
Figure 1B:
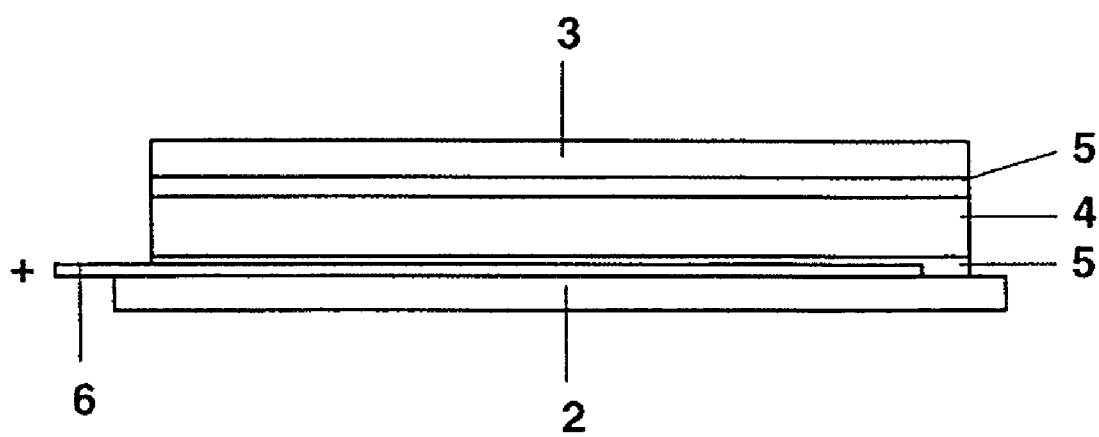
FIG. 1b shows a diagrammatic side view of the lamp shown in FIG. 1a, FIG. 2 shows the measured, standardized spectral intensity distribution of the lamp according to the invention with a first phosphor mixture and the color temperature 7100 K.

FIGS. 1a, 1b respectively show a diagrammatic plan view and side view of a dielectric barrier discharge lamp 1 according to the invention. This is a flat dielectric barrier discharge lamp for the illumination of film recordings. Purely to simplify the illustration, a lamp with a relatively small number of electrode strips and consequently a relatively short lamp diagonal is shown. This aspect will be explained in more detail below in connection with FIG. 5. The basic mechanical and electrical structure of this flat lamp in any case substantially corresponds to that of the lamp disclosed in U.S. Pat. No. 6,034,470, which was cited above. The main difference is in the phosphor layer. Before this is dealt with in detail, the basic structure of the lamp 1 according to the invention will be outlined with reference to FIGS. 1a, 1b.

The flat lamp 1 comprises a flat discharge vessel with a rectangular basic area and a set of electrodes arranged inside the discharge vessel. The discharge vessel for its part comprises a back plate 2, a front plate 3 and a frame 4, in each case made from glass. Back plate 2 and front plate 3 are in each case joined to the frame 4 in a gastight manner by means of soldering glass 5, in such a manner that the interior of the discharge vessel is of cuboidal form. The interior of the discharge vessel is filled with xenon with a pressure of approx. 130 mbar. The back plate 2 is larger than the front plate 3, such that the discharge vessel has a projecting edge all the way around. Two supply conductors 6, 7, which resemble conductor tracks, for the set of electrodes are applied to this edge.

Figure 2:
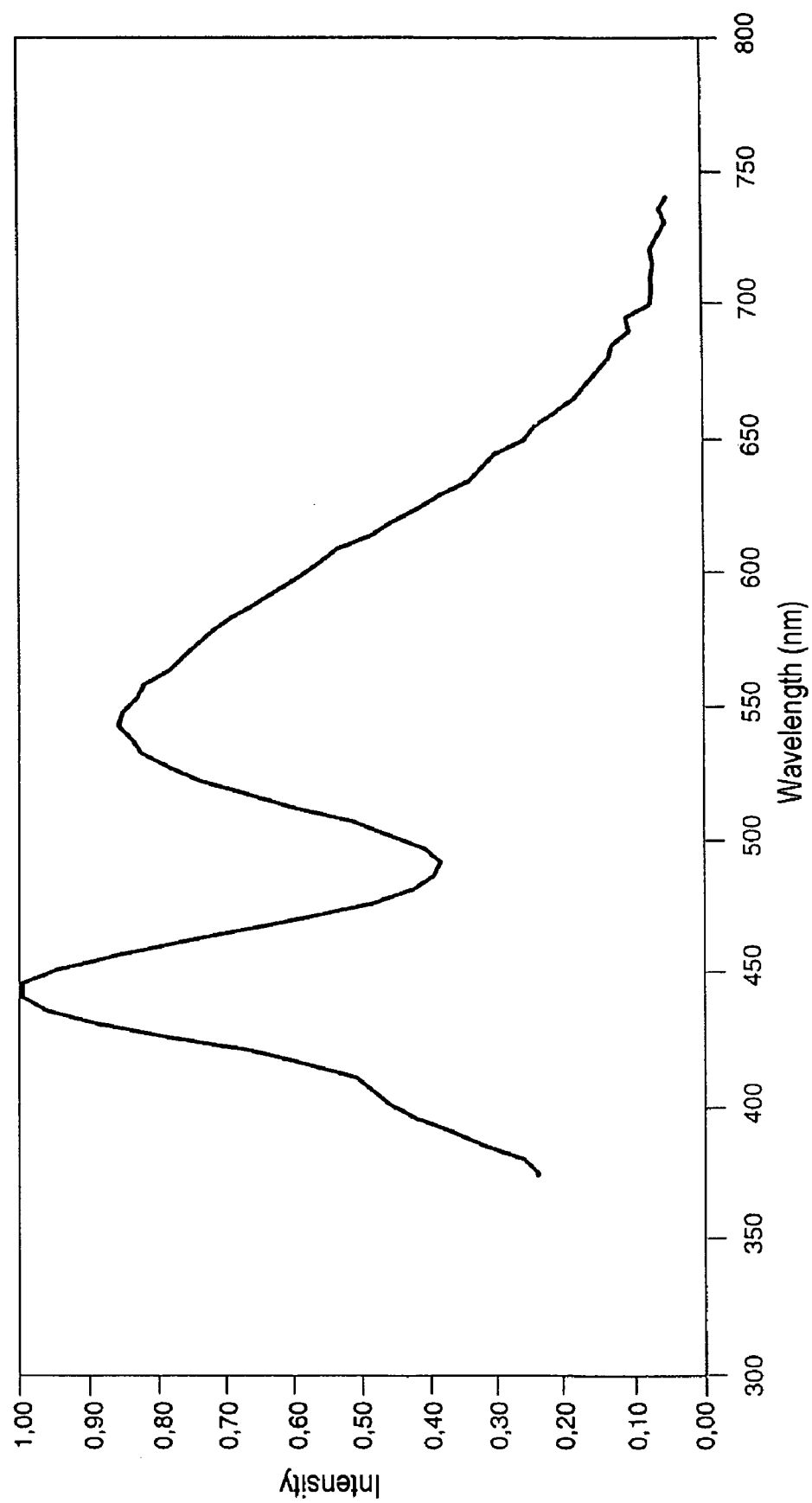

The inner surface of the front plate 3 is coated with a phosphor mixture (not visible in the drawing), which converts the UV/VUV radiation generated by the discharge into visible white light. This phosphor mixture comprises the two phosphor components $Y_3Al_5O_{12}$:Ce and $BaMgAl_{10}O_{17}$:Eu in proportions by weight of 28% and 72%, respectively. The lamp has a color temperature of 7100 K. The general color rendering index $R_a$ is 76. FIG. 2 shows the measured, standardized spectral intensity distribution (X axis: wavelength in nm; Y axis: intensity standardized to 1) of this lamp.

Figure 3:
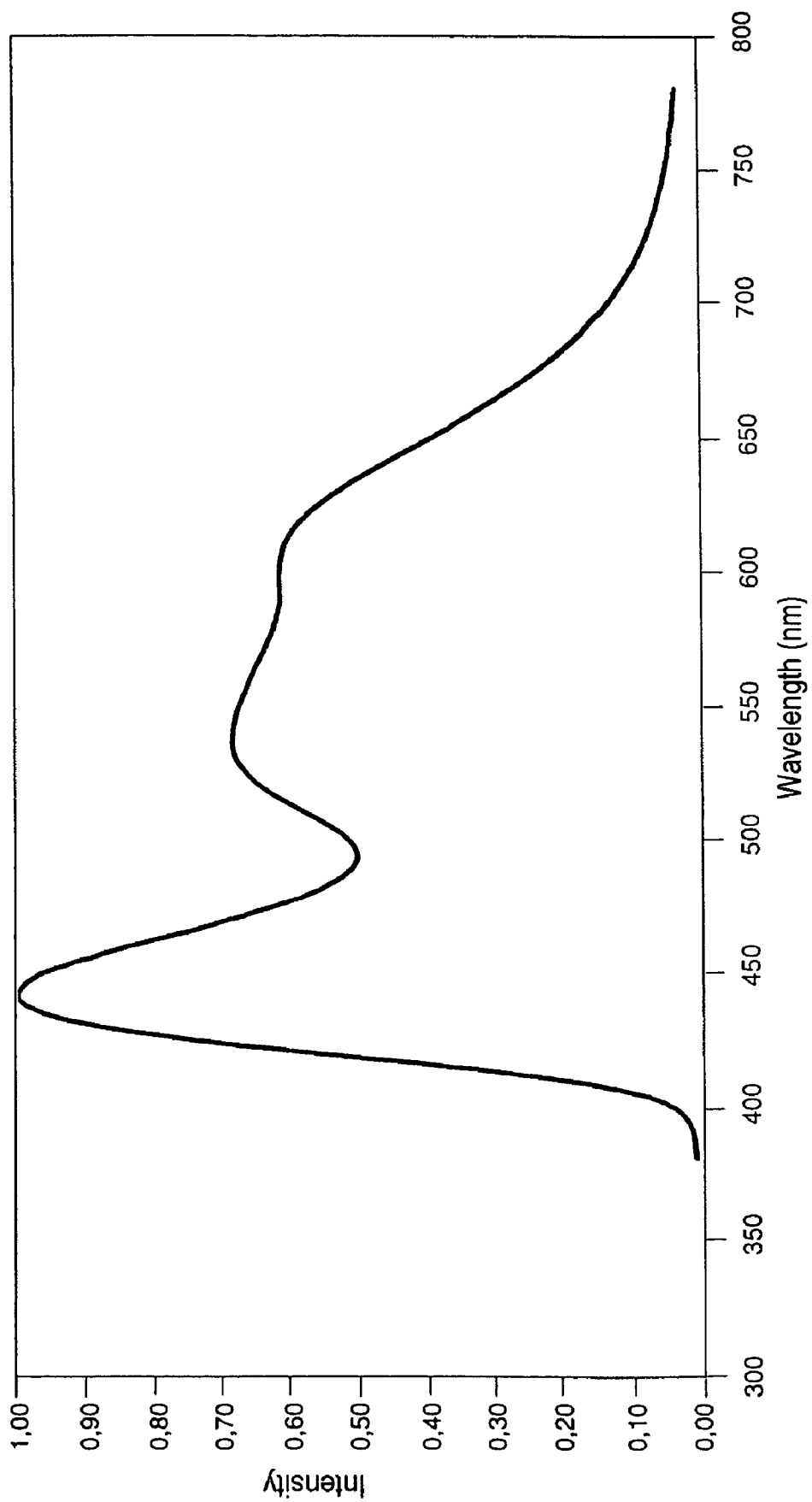
FIG. 3 shows the measured, standardized spectral intensity distribution of the lamp according to the invention with a different phosphor mixture and the color temperature 6800 K.

FIG. 3 shows the measured, standardized spectral intensity distribution of a modified lamp comprising the four phosphor components A:=$Y_3Al_5O_{12}$:Ce, B:=$BaMgAl_{10}O_{17}$:Eu, C:=$Gd(Zn, Mg)B_5O_{10}$: (Ce, Mn) and D:=$Sr_4Al_{14}O_{25}$:Eu in proportions by weight of 22%, 38%, 31% and 9%, respectively. The lamp comprising this phosphor mixture is distinguished by a general color rendering index of $R_a$=90 and a red rendering index $R_9$=75. The color temperature is 6800 K. Furthermore, the lamp spectrum is also matched to the spectral sensitivity curve of film material.

Figure 4:
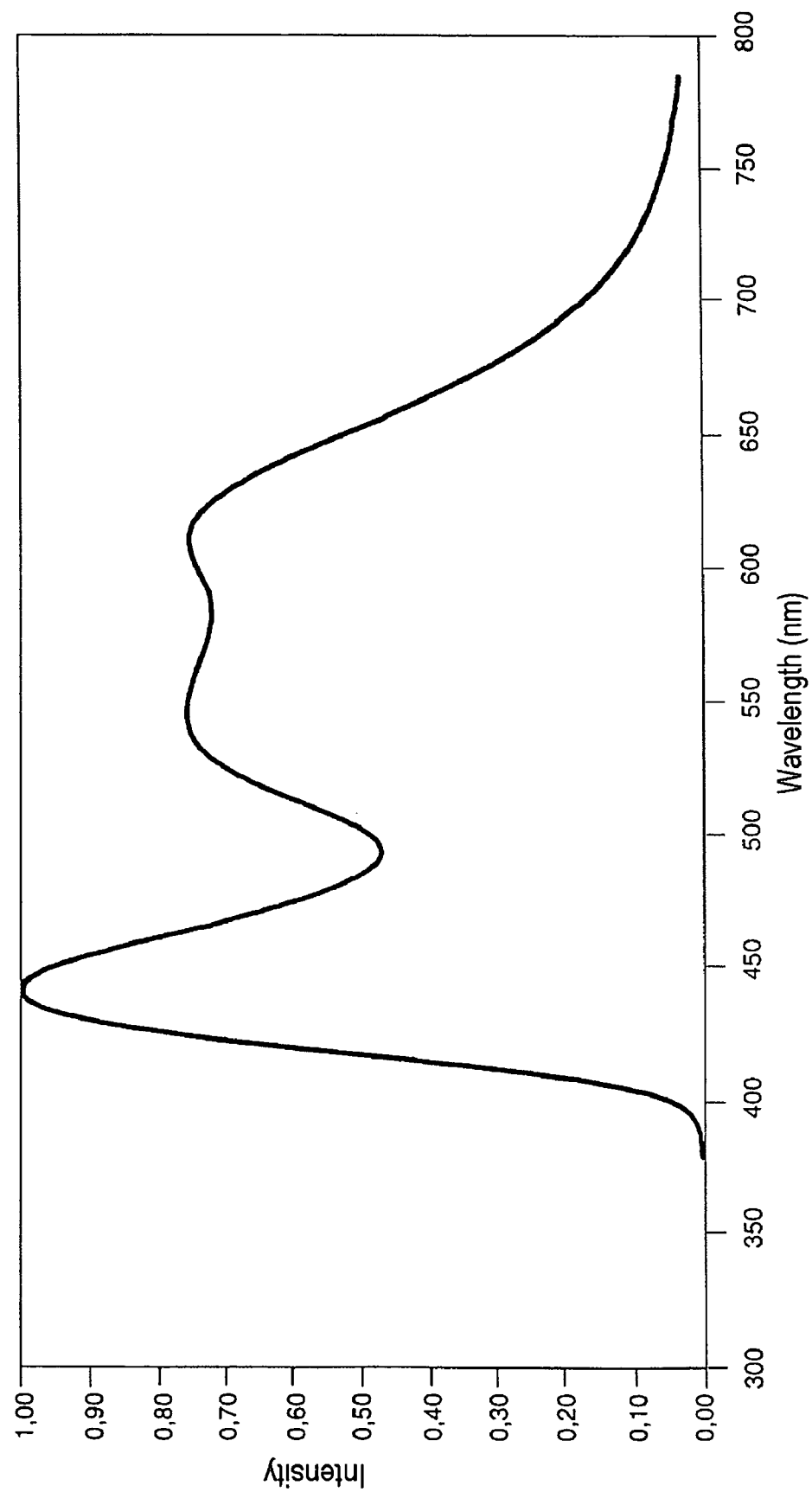
FIG. 4 shows the measured, standardized spectral intensity distribution of the lamp according to the invention with a further phosphor mixture and the color temperature 5700 K.

FIG. 4 shows the measured, standardized spectral intensity distribution of a variant in which only the mixing ratios of the abovementioned phosphor components A, B, C, D have been changed, specifically to 25%, 33%, 37% and 5%, respectively. The spectrum is even better matched to the spectral sensitivity curve of film material. The general color rendering index $R_a$ and the red rendering index $R_9$ are approx. 92 and 82, respectively. The color temperature is approx. 5700 K.

A further improvement was achieved by the slightly modified mixture A:B:C:D=0.26:0.32:0.37:0.05 (not shown).

Figure 5:
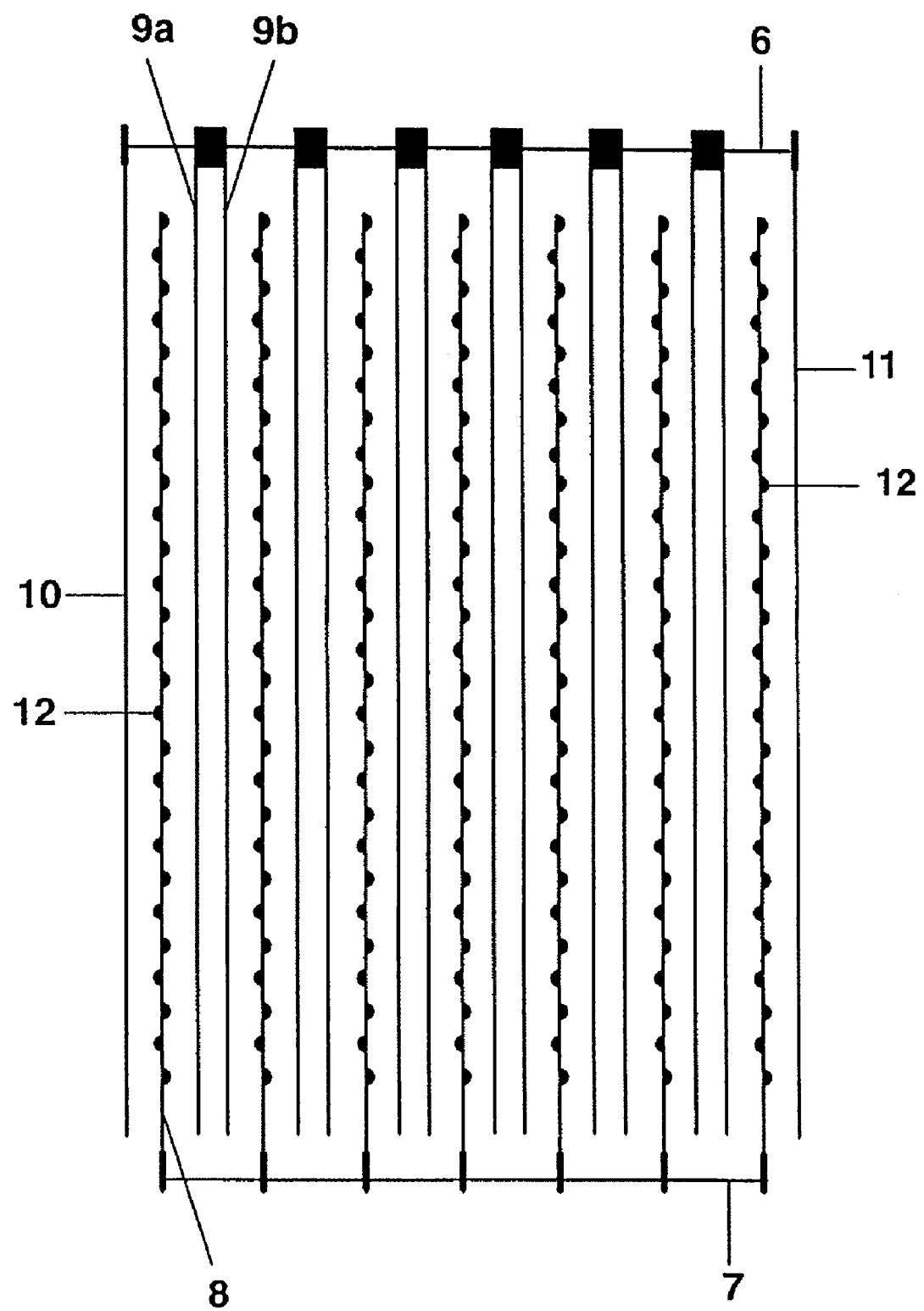
FIG. 5 shows the basic conditions of the electrode structure for a flat lamp according to the invention with a diagonal of 6.8" which is preferably to be operated with unipolar voltage pulses.

To improve the clarity of the drawing, a representative layout of a set of electrodes for a lamp diagonal of 6.8" for the lamp illustrated in FIGS. 1a, 1b is diagrammatically depicted in FIG. 5. In the case of a lamp with a larger diagonal, there are no changes to the basic layout of the set of electrodes, but rather it is simply the case that a correspondingly greater number of and longer electrode strips are required. The set of electrodes comprises a conductor track-like structure having strip-like metallic cathodes 8 and anodes 9, 10, 11 which are arranged alternately and parallel to one another on the inner surface of the back plate 2. The cathode strips 8 deliberately have spatially preferred starting points for the individual discharges formed in pulsed operation (cf. in this respect the above-cited document EP 0 733 266 B1), which are realized by lug-like projections 12 facing the respective adjacent anode strip. They effect locally delimited boosting of the electric field, so that the delta-shaped individual discharges (not shown) are ignited exclusively at these locations 12. With the exception of the two outer anodes 10, 11, the other anodes 9 have a double structure 9a, 9b. All the anodes 9–11 are covered with a dielectric layer of soldering glass (not shown). The anodes 9–11 and cathodes 8 are each extended at one end and on the back plate 2 lead out of the interior of the discharge vessel on both sides, in such a manner that the associated anodic and cathodic leadthroughs are arranged on opposite sides of the back plate 2. On the edge of the back plate 2, the electrode strips 8–11 each merge into the abovementioned cathode-side 6 or anode-side 7 supply conductor. The supply conductors 6, 7 serve as contacts for connection to preferably an electric pulsed voltage source 13. For a flat lamp with, for example, a 15" diagonal (not shown), a set of electrodes (not shown) having 12 cathode strips and 11 double anode strips as well as two outer single anodes is provided. Each anode strip has in each case 13 projections to ignite the individual discharges along each of the two longitudinal sides.

Figure 6:
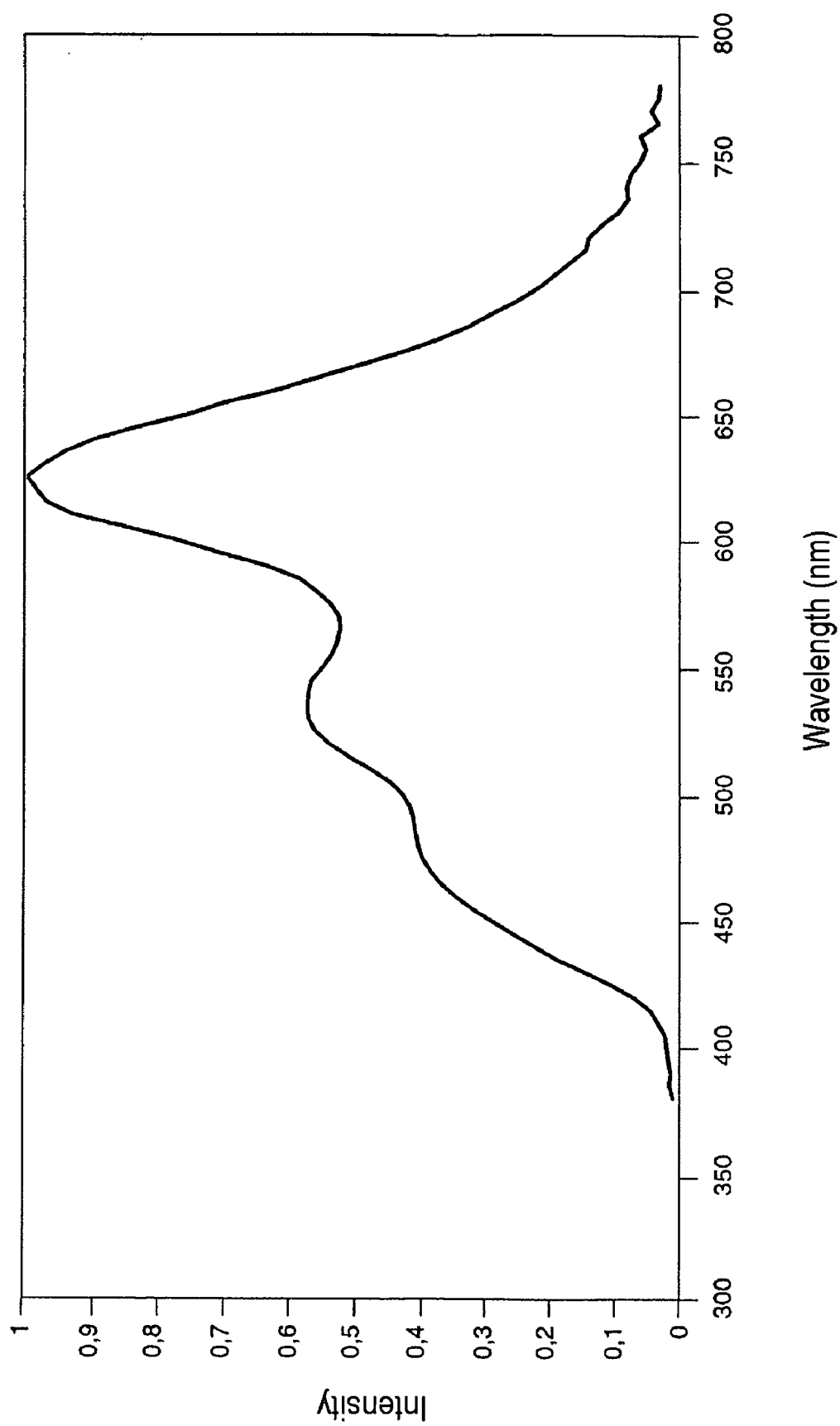
FIG. 6 shows the measured, standardized spectral intensity distribution of the lamp according to the invention with a further phosphor mixture and the color temperature 3200 K.

FIG. 6 illustrates the measured, standardized spectral intensity distribution (X axis: wavelength in nm; Y axis: intensity standardized to 1) of a further variant, which is designed for a color temperature of approx. 3200 K. The color locus in the CIE standard color diagram has the coordinate x=0.421 and y=0.394. For this purpose, the proportions by weight of the four phosphor components are A:B:C:D=17.4:8.6:63.2:10.8, with A:=$Y_3Al_5O_{12}$:Ce, B:=$BaMgAl_{10}O_{17}$:Eu, C:=$Gd(Zn, Mg)B_5O_{10}$: (Ce, Mn) and D:=$Sr_4Al_{14}O_{25}$:Eu. The spectrum is well matched to the spectral sensitivity curve of the film material designed for this color temperature and, furthermore, is distinguished by the general color rendering index $R_a$=91 and the red rendering index $R_9$=92.

Although the invention has been explained in detail above with reference to the example of a flat dielectric barrier discharge lamp, it is not restricted to this form of lamp. Rather, its advantageous effects also result in the case of lamps with other shapes of vessel, for example in the case of tubular lamps. In the latter case, the set of electrodes comprises two or more elongate electrodes which are arranged parallel to the lamp longitudinal axis on the wall of the tubular discharge vessel.

For a film light (not shown), at least one flat dielectric barrier discharge lamp of the type described above is mounted in a flat light casing, which in the simplest case is a frame in which the flat lamp(s) is(are) suspended. The lamp casing is arranged on a base, the height of which can preferably be adjusted. The electrical supply unit required for operation of the flat dielectric barrier discharge lamp may be arranged inside or outside the film light.

The invention claimed is:

1. A dielectric barrier discharge lamp, comprising:
a discharge vessel containing a xenon discharge medium;
a set of electrodes for generating dielectric barrier discharges in the xenon discharge medium whereby xenon excimer radiation is emitted; and
a phosphor mixture applied at least to a portion of a wall of the discharge vessel, the phosphor mixture consisting essentially of phosphor components A, B, C, and D wherein component A is $Y_3Al_5O_{12}$:Ce, component B is $BaMgAl_{10}O_{17}$:Eu, component C is $Gd(Zn,Mg)B_5O_{10}$:(Ce,Mn), and component D is $Sr_4Al_{14}O_{25}$:Eu and wherein the phosphor components have the following proportions by weight in the mixture:

$0.01 \leq A \leq 0.50, 0.05 \leq B \leq 0.50, 0.05 \leq C \leq 0.70,$
$0 \leq D \leq 0.25$ and $A+B+C+D=1$.

2. The discharge lamp as claimed in claim 1, in which the following applies to the proportions by weight in the mixture:

$0.01 \leq A \leq 0.50, 0.10 \leq B \leq 0.50, 0.05 \leq C \leq 0.50,$
$0 \leq D \leq 0.25$ and $A+B+C+D=1$.

3. The dielectric barrier discharge lamp as claimed in claim 1, in which the following applies to the proportions by weight in the mixture:

$0.10 \leq A \leq 0.40, 0.15 \leq B \leq 0.40, 0.10 \leq C \leq 0.40,$
$0 < D \leq 0.15$ and $A+B+C+D=1$.

4. The dielectric barrier discharge lamp as claimed in claim 1, in which the following applies to the proportions by weight in the mixture:

$0.20 \leq A \leq 0.24, 0.36 \leq B \leq 0.40, 0.29 \leq C \leq 0.33,$
$0.07 \leq D \leq 0.11$ and $A+B+C+D=1$.

5. The dielectric barrier discharge lamp as claimed in claim 1, in which the following applies to the proportions by weight in the mixture:

$0.23 \leq A \leq 0.28, 0.30 \leq B \leq 0.39, 0.30 \leq C \leq 0.39,$
$0.03 \leq D \leq 0.10$ and $A+B+C+D=1$.

6. The dielectric barrier discharge lamp as claimed in claim 1, in which the following applies to the proportions by weight in the mixture:

$0.14 \leq A \leq 0.20, 0.05 \leq B \leq 0.12, 0.58 \leq C \leq 0.67,$
$0.05 \leq D \leq 0.15$ and $A+B+C+D=1$.

* * * * *

UNITED STATES PATENT AND TRADEMARK OFFICE
CERTIFICATE OF CORRECTION

PATENT NO. : 7,122,951 B2
APPLICATION NO. : 10/492026
DATED : October 17, 2006
INVENTOR(S) : Heider et al.

It is certified that error appears in the above-identified patent and that said Letters Patent is hereby corrected as shown below:

On the Title Page of the patent, left-hand column, item (73), the Assignee "Patent-Treuhand-Gesellschaft fuer Elektrisch Gluehlampen mbH, Munich (DE)" should read:

-- Patent-Treuhand-Gesellschaft fuer Elektrische Gluehlampen mbH, Munich (DE); Arnold & Richter Cine Technik GmbH & Co. Betriebs KG, Munich (DE) --.

Signed and Sealed this

Thirteenth Day of February, 2007

JON W. DUDAS
*Director of the United States Patent and Trademark Office*